United States Patent [19]

Homan et al.

[11] Patent Number: 4,460,972
[45] Date of Patent: Jul. 17, 1984

[54] SINGLE CHIP MICROCOMPUTER SELECTIVELY OPERABLE IN RESPONSE TO INSTRUCTIONS STORED ON THE COMPUTER CHIP OR IN RESPONSE TO INSTRUCTIONS STORED EXTERNAL TO THE CHIP

[75] Inventors: Merle E. Homan, Los Gatos; Guenther K. Machol, Saratoga; Larry M. Warren, San Martin, all of Calif.

[73] Assignee: International Business Machines Corporation, Armonk, N.Y.

[21] Appl. No.: 288,631

[22] Filed: Jul. 30, 1981

Related U.S. Application Data

[63] Continuation of Ser. No. 51,261, Jun. 22, 1979, abandoned.

[51] Int. Cl.³ .............................................. G06F 13/00
[52] U.S. Cl. ............................................................ 364/900
[58] Field of Search ................................ 364/200, 900

[56] References Cited

U.S. PATENT DOCUMENTS 4,087,854  5/1978  Kinoshita et al. ................ 364/200
4,093,982  6/1978  Heuer et al. ...................... 364/200
4,153,933  5/1979  Blume et al. ..................... 364/200

OTHER PUBLICATIONS

PDP 11/45 Handbook, Digital Equipment Corporation, published 1975, Chapters 4 and 7.

Primary Examiner—Felix D. Gruber
Assistant Examiner—John G. Mills
Attorney, Agent, or Firm—Otto Schmid, Jr.

[57] ABSTRACT

A microprocessor external instruction feature which provides for a single chip microprocessor with on-chip read only instruction store (ROS) that can also be operated with an off-chip instruction store. To accomplish this, the microprocessor instruction sequencing logic (instruction store, instruction register, instruction counter, and sequencing logic) is duplicated off-chip. An XI MODE input pin signal causes the microprocessor to take its instructions from the external instruction store via 12 XI input pins instead of from the on-chip ROS. A BR DECISION output pin signal from the microprocessor, which indicates that the branch conditions have been met, causes the external instruction counter to be loaded with a branch address from the external instruction register instead of being stepped by external sequencing logic. A WAIT output pin signal causes the external instruction feature logic to suspend operations while the microprocessor is in its wait state.

8 Claims, 8 Drawing Figures

SINGLE CHIP MICROCOMPUTER SELECTIVELY OPERABLE IN RESPONSE TO INSTRUCTIONS STORED ON THE COMPUTER CHIP OR IN RESPONSE TO INSTRUCTIONS STORED EXTERNAL TO THE CHIP

This is a continuation, of application Ser. No. 051,261 filed Jun. 22, 1979, and now abandoned.

BACKGROUND OF THE INVENTION

The present invention relates to improved signal processing apparatus and more particularly to apparatus in a single chip digital microcomputer which can be selectively operated in response to instructions stored on the computer chip or in response to instructions stored external to the chip.

There has been a recent increase in the use of microcomputers to perform many highly specialized uses. One reason for this increase is the development of a microcomputer containing a microprocessor, a program store, a random access store, and input/output device controllers on one monolithic integrated chip. Because the microcomputer is built on a single chip, the capacity of the instruction store is necessarily small due to the limited chip area. In some applications it is desirable to have additional program storage available. Prior art systems have solved this problem by utilizing an external storage unit to store additional instructions. The instructions stored in the external storage are accessed by sending the address from the on-chip address register to the external store. This mode of operation has the disadvantage that the capacity of the external storage is limited by the number of address bits that can be sent. A finite number of I/O pins is available on the chip and this limitation, along with the desire to limit the chip area devoted to the address register, limits the number of address bits that can be sent.

The on-chip program store is generally some type of Read Only Memory (ROM) in which the bit pattern is programmed at the factory through the use of prepared masks so that, once the instructions are programmed in this fashion, they cannot be changed. To establish some flexibility in the on-chip ROM, there has been developed the so-called "Development Systems" in which a Programmable Read Only Memory (PROM) is implemented on the chip. One such system is described in U.S. Pat. No. 4,153,933 to Blume, Jr. et al. In this system the program instructions can be established from external sources in the presence of a programming voltage applied to one of the chip terminals. An off-chip program store is also provided in this system, but this storage is addressed from addresses generated on-chip. Thus, this system has more flexibility in the on-chip storage, but has the same disadvantage relative to the off-chip instruction store as previously stated.

SUMMARY OF THE INVENTION

It is the principal object of this invention to provide unlimited off-chip program storage usable with no degradation of performance and without the requirement for additional I/O pins or active area on the chip.

Computing apparatus in accordance with the invention provides a first instruction store and a first instruction register on the single computer chip and external to the chip a second instruction store and instruction mode specifying means for specifying internal or external mode for loading said first instruction register selectively from said first or said second instruction stores.

In accordance with a further feature of the invention, the apparatus comprises an external instruction counter and means responsive to execution of a branch instruction on the chip with branch conditions met for altering the external instruction counter.

DESCRIPTION OF THE PREFERRED EMBODIMENT

The apparatus of the present invention may be employed in any suitable stored program computer in which it is required to execute both internally stored and externally stored instructions. However, by way of example, the invention is described as specifically embodied in the microcomputer shown in FIG. 1.

Figure 1:
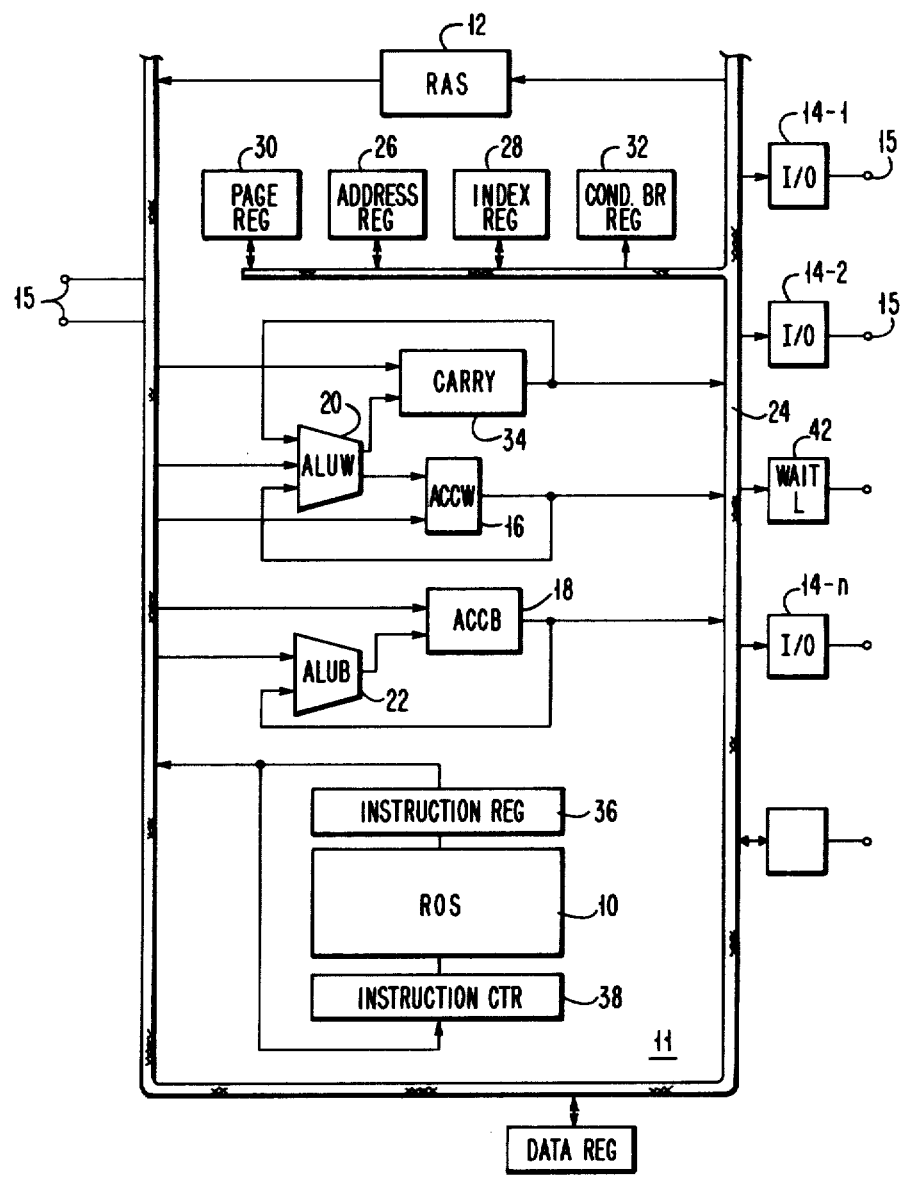
FIG. 1 is a schematic data-flow diagram of a single-chip microcomputer in which the invention is particularly useful.

The microcomputer is utilized along with a clock chip and a utilization device which, in a specific system, is a communication loop. The details of the interaction between the microcomputer and the communication loop are not disclosed, since they are not necessary to an understanding of the invention. FIG. 1 is a block diagram of the major parts of a microcomputer utilized in the present invention. The microcomputer includes on a single chip 11 Read Only Storage (ROS) means 10, and Random Access Storage Means (RAS) 12. The ROS 10 contains a large number, 1,024 for example, of instruction words of twelve bits per word, for example, and is used to store the program which operates the system. The RAS 12 contains, for example, 128 read-write storage cells of four bits each, for example, available for working storage and data buffering. Two groups of instructions are provided. Bit mode instructions operate on a single bit of data, while word mode instructions operate on a data word (four bits in the specific embodiment shown). The microcomputer has arithmetic and logic means which utilizes two accumulators and two Arithmetic and Logic Units (ALU). One accumulator 16 and ALU 20 are used for executing word instructions and the second accumulator 18 and second ALU 22 are utilized for executing bit instructions. Space is provided on the chip for specialized I/O interface adapters 14-1 through 14-N and communication between these interfaces and the CPU is provided by system bus 24. Each of the outputs are latched and available to the processor as a destination and coupled to appropriate I/O pins 15. Several signals are presented as inputs to system bus 24 through appropriate I/O pins 15. Each of these input signals is available to the processor as a source.

Figure 3:
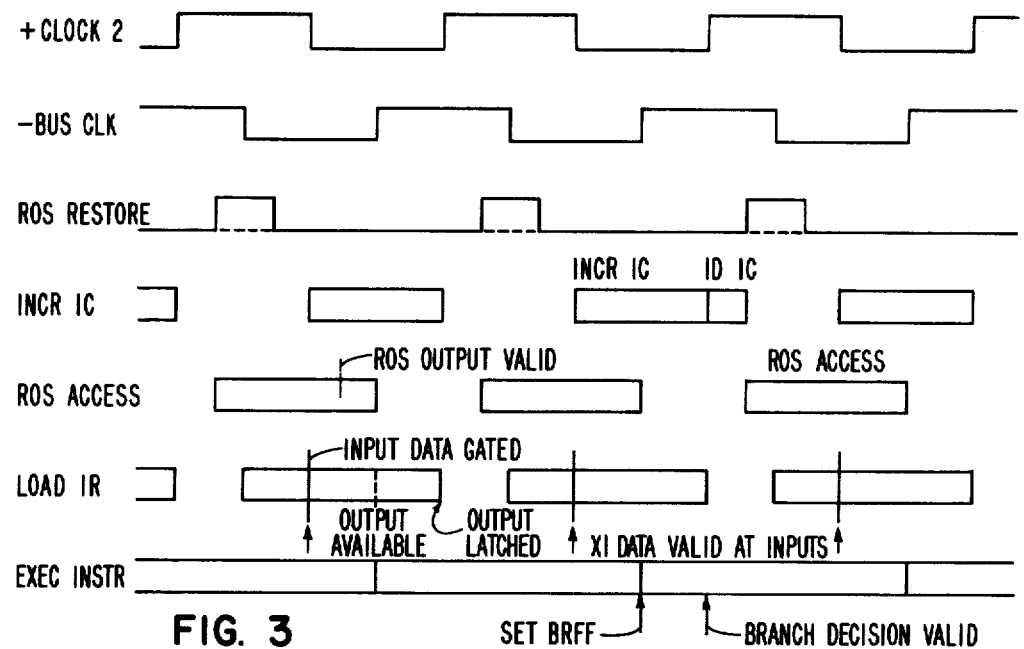
FIG. 3 is a timing diagram which illustrates the relative timings of the signals to control the microcomputer components.

Basic clock control of the microcomputer is supplied by a clock chip (not shown). These clock signals (See FIG. 3) comprise +CLOCK 2, which is used to increment the instruction counter 38. One instruction is executed for each +CLOCK 2 cycle except for two cycle operations such as a conditional branch, for example. Appropriate signals are provided to continuously operate the RAS 12 on the chip, and also provided is the signal ROS RESTORE and other appropriate signals needed to operate the ROS 10 on the chip. The −BUS CLK signal is used to gate data onto the system bus 24. The relative timing of the various stages in the process of accessing and executing an instruction are shown in FIG. 3.

Figure 6:
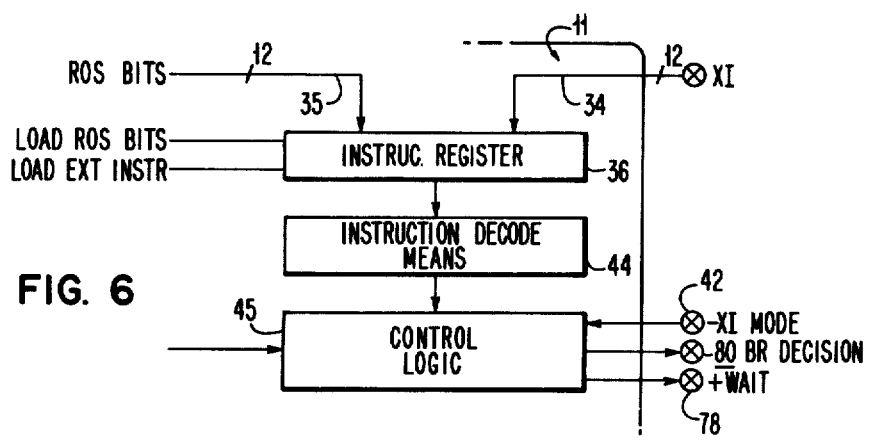
FIG. 6 is a schematic block diagram of the instruction accessing apparatus of the microcomputer of FIG. 1.

The ROS timing signals control the accessing of the program instructions specified by the address in instruction counter 38 (FIGS. 1 and 2), and the operation to be performed is decoded by instruction decode means 44 (FIG. 6). Logic circuits 45 receive signals from decode means 44 and machine state information for generating control signals to execute the instruction. Conductor means are provided to transfer data and control signals from instruction decode means 44 and control logic 45 to RAS 12 and a plurality of internal registers including index register 28, page register 30, address register 26 and conditional branch register 32.

Figure 4:
FIG. 4 is a diagram showing the general instruction format of the short instructions for the microcomputer of FIG. 1.
Figure 5:
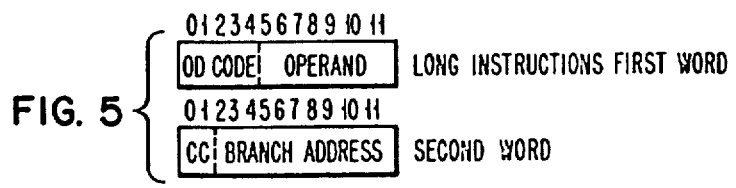
FIG. 5 is a diagram showing the instruction format of the long instructions for the microcomputer of FIG. 1.

The instructions for the microcomputer are of two types. Those which reference or operate on a word (four bits) of information, and those which reference or operate on a single bit. The operation code determines whether an instruction is of the word or bit type. There are two instruction formats used with the microcomputer: A short instruction is one ROS word (twelve bits) and normally executed in one instruction cycle. A long instruction is two ROS words and normally is executed in two cycles. The general instruction format is shown in FIG. 4 for short instructions and FIG. 5 for long instructions. In the short instructions, the high order bits 0 through 4 define the operation code and bits 5 through 11 comprise the operand field. The operand field may designate a source, a destination, or modifiers. The long instructions are two ROS words long and the first word has the same format as the short instruction. When the first word is decoded, the branch flip-flop is set to indicate that the next word is the second of the branch instruction words. The second word (see FIG. 5) utilizes bits 0 and 1 to form a branch condition code. Bits 2 through 11 define the branch address. After the second word is processed, the branch flip-flop is reset. In word mode instructions, either the word accumulator 16 or the address register 26 is implied. This group of instructions comprises move operations, register operations, logical operations, arithmetic operations, branch operations, and input/output operations. In bit mode instruction, the bit accumulator 18 is implied. This group of instructions comprises move operations, logical operations, set operations, and branch operations.

The novel aspects of the operation of the system in executing both bit and word instructions and the instructions used are described in greater detail and claimed in co-pending application "Microcomputer Having Separate Bit and Word Accumulators and Separate Bit and Word Instruction Sets" by one of the co-inventors, G. K. Machol, which was filed Dec. 15, 1978, and accorded Ser. No. 970,082.

Figure 2:
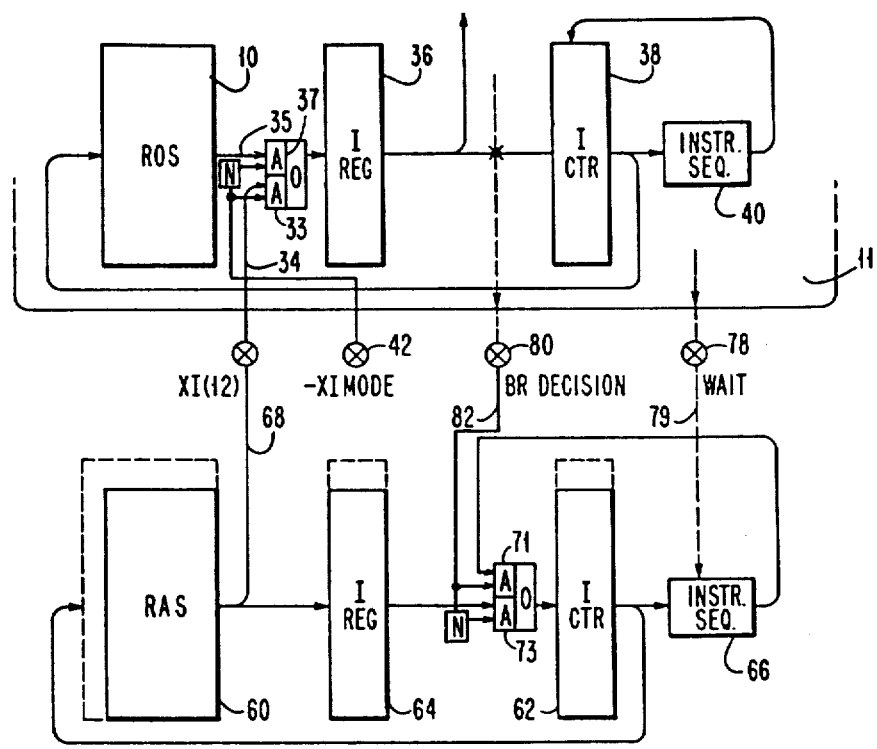
FIG. 2 is a schematic block diagram showing the external address apparatus for the microcomputer of FIG. 1.

The apparatus for executing external instructions in the microcomputer of FIG. 1 is shown in FIG. 2. The parts of the microcomputer on chip 11 which relate to the addressing and accessing of instructions is shown. As previously described, ROS 10 stores the instructions and the contents of instruction counter 38 is used to address the next instruction to be executed. Instruction sequencing means 40 comprises the control logic on the chip which provides the means for incrementing instruction counter 38 at the appropriate time (see FIG. 3). The instruction is read from ROM 10 and stored in instruction register 36. External to the chip 11 is a Random Access Storage (RAS) 60, which is addressed by Instruction Counter 62, and the addressed instruction is read out to Instruction Register 64. A sequence of instructions to control the microcomputer is stored in external RAS 60 and these instructions can be accessed by the address in instruction counter 62 as controlled by instruction sequencing control means 66.

In contrast to prior art systems in which externally stored instructions were accessed by instructions generated on the chip, the present system provides externally generated addresses. The on-chip microcomputer and the external addressing means are kept in cycle by cycle synchronism by operating the external apparatus from the same clock pulse source. The signals BR DECISION and WAIT are transmitted from the chip 11 to the external circuits to induce a program branch or halt in the externally generated instruction sequence at points in time determined by on-chip 11 control means.

During normal operation of the microcomputer an instruction is accessed from on-chip ROS 10 as specified by the address counter 38 and in parallel with this operation an instruction is accessed from the external RAS 60 as specified by external instruction counter 62. However, the system can also be operated by taking all instructions from either the on-chip ROS 10 or the external RAS 60, if desired. The externally accessed instruction (12 bits) is transmitted by suitable conductive path 68 to the twelve XI I/O pins on the microcomputer chip designated $XI_0$ to $XI_{11}$. The external instruction is selectively transmitted over conductive path 34 for loading into on-chip instruction register 36. The control for this selective operation is provided by a control voltage to the I/O pin designated XI MODE. This control signal may be generated by any suitable means such as a switch, a signal from an external operation or by other means at the option of the user. In a specific example, the signal may have a down digital level of ground potential and an up digital level of +5 volts. When the appropriate control voltage level is present at the XI MODE I/O pin, AND circuit 33 is conditioned and the instruction is loaded from the twelve XI I/O pins over conductive path 34 to instruction register 36. However, when the control voltage is not present at the XI MODE pin, AND circuit 37 is conditioned and the instruction is loaded over conductive path 35 from the on-chip ROS 10.

To maintain the appropriate sequence of instruction control when using the external instruction store, the signal BR DECISION is provided on I/O pin 80 and transmitted to the external storage sequencing means 66. When active, this signal conditions AND circuit 71 and causes the branch address in off-chip instruction register 64 to be transferred to the off-chip instruction counter 62 so that the next instruction loaded from the twelve XI I/O pins will be from the location in RAS 60 pointed to by the branch address.

When BR DECISION is not active, AND circuit 73 is conditioned and the off-chip instruction counter 62 is stepped by the instruction sequencing control means 66 to address the next sequential instruction in off-chip RAS 60.

The number of address bits in the external RAS 60, instruction register 64, and instruction counter 62 is a function of the RAS 60 size, which may be and is generally greater than for the corresponding on-chip components. In this case, the low order bits will contain the standard instruction information and the additional high order bits will be used for external branch address information.

Thus this system has the advantage that instructions can be selectively executed either from the on-chip instruction store or from the external instruction store without a limitation on the size of the external store because of the number of address bits available on the computer chip. The external store can be of any desired size since its instruction counter is also located external to the chip and thus is not constrained in size by on-chip circuit area considerations or I/O pin constraints.

Figures 7, 8:
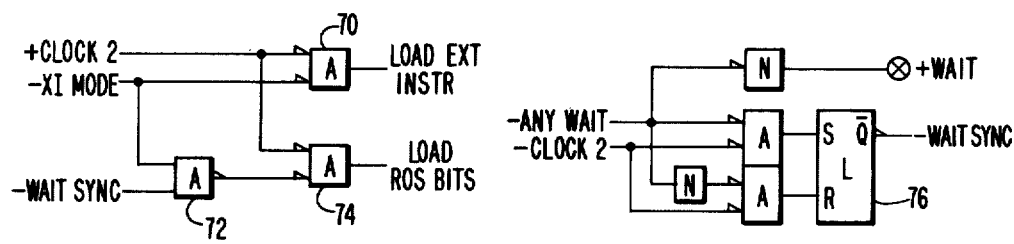
FIGS. 7 and 8 are logic diagrams showing the part of the control logic of FIG. 6 relating to selection of instruction source for the microcomputer of FIG. 1.

In the specific embodiment shown the control of the instruction source is provided by control logic means 45 (FIG. 6). As shown in FIGS. 7 and 8, the −XI MODE signal and the +CLOCK 2 signal are coupled to AND circuit 70. The convention in these logic circuits is that a wedge on a line means that the down level of the digital signal is the active level. Thus, when the −XI MODE pin is at an up digital level (positive) AND circuit 70 is not conditioned; however, AND circuits 72 and 74 are conditioned to generate the signal LOAD ROS BITS if the WAIT SYNC latch is not set. When the −XI MODE input is at the down digital level (negative) AND circuit 70 is conditioned to generate the signal LOAD EXT INSTR.

The microcomputer has the capability of entering a WAIT state in which execution of instructions is inhibited until some predetermined event occurs. The WAIT SYNC latch 76 is set or reset at the beginning of an instruction cycle by the presence or absence of a signal generated from any of the WAIT latches 42 in FIG. 1 indicating that the microcomputer is to enter the WAIT state. The WAIT signal is available as an external output at pin 78, and it is coupled by conductor means 79 to external instruction sequencing means 66 to inhibit changing instructions on the External Instruction (XI) input when the microcomputer is in the WAIT state.

Instruction register 36 (FIGS. 1, 2, and 6) is a parallel loadable register with inputs from ROS 10 on lines 35 and from the externally provided instruction on lines 34. The signals LOAD ROS BITS and LOAD EXT INSTR are coupled to instruction register 36 to load the instruction from the appropriate source depending on which of the signals is active.

To indicate to the external instruction store that a branch should be taken, the signal BR DECISION is generated. This signal indicates that the conditions for a Branching instruction have been met and the signal is coupled to I/O pin 80 and over conductor means 82 to the external instruction counter 62.

While the invention has been particularly shown and described with reference to preferred embodiments thereof, it will be understood by those skilled in the art that the foregoing and other changes in form and detail may be made therein without departing from the spirit, scope and teaching of the invention. Accordingly, the apparatus herein disclosed is to be considered merely as illustrative, and the invention is to be limited only as specified in the claims.

Having thus described our invention, what we claim as new, and desire to secure by Letters Patent is:

1. Microcomputing apparatus, comprising a single chip microprocessor;
   a first instruction store on said single chip microprocessor for storing a first series of instructions to control operation of the apparatus;
   a first instruction register on said single chip microprocessor coupled to selectively receive instructions read out from said first instruction store or from a second instruction store;
   a first instruction address generating means on said single chip microprocessor for generating a first address for addressing said first instruction store to cause an instruction to be read out of said first instruction store;
   a second instruction store external to said single chip microprocessor for storing a second series of instructions to control operation of the apparatus;
   an external instruction counter external to said single chip microprocessor for generating a second address for addressing said second instruction store to cause an instruction to be read out of said second instruction store; and
   instruction mode means responsive to a first signal on said single chip microprocessor, said first signal having a first state specifying internal mode and a second state specifying external mode, said instruction mode means including means responsive to a specified internal mode for loading into said first instruction register the instruction read from said first instruction store in response to said first address and responsive to a specified external mode for loading into said first instruction register the instruction read out from said second instruction store in response to said second address.

2. The apparatus of claim 1, further comprising means for generating a second signal on said single chip microprocessor responsive to execution of a branch instruction on said single chip mircroprocessor with branch conditions met, and means for coupling said second signal to said external instruction counter for altering said external instruction counter.

3. The apparatus of claim 1 wherein the storage capacity of said second instruction store exceeds the storage capacity of said first instruction store.

4. The apparatus of claims 1 additionally comprising external mode terminal means on said single microprocessor chip,
   means for coupling said instruction read out of said second instruction store in response to said external instruction counter to said external mode terminal means; and
   means for coupling said instruction read out of said second instruction store from said external mode terminal means to said first instruction register in response to said first signal having a state specifying external mode.

5. Microcomputing apparatus, comprising a single chip microprocessor
   a first instruction store on said single chip microprocessor for storing a first series of instructions to control operation of the apparatus;

a first instruction register on said single chip microprocessor coupled to selectively receive instructions read out from said instruction store or from external instruction mode terminal means;

a first instruction address generating means on said single chip microprocessor for generating a first address for addressing said first instruction store to cause an instruction to be read out of said first instruction store;

external instruction mode terminal means on said single chip microprocessor accessible to an external source of signals;

a second instruction store external to said single chip microprocessor for storing a second series of instructions to control operation of the apparatus;

an external instruction counter external to said single chip microprocessor for generating a second address for addressing said second instruction store to cause an instruction to be read out of said second instruction store; and instruction mode means on said single chip microprocessor selectively specifying internal mode in response to a first signal having a first digital state at said external instruction mode terminal means for loading said first instruction register with the instruction read out from said first instruction store in response to the address from said first instruction address generating means and specifying external mode in response to said first signal having a digital state opposite to said first digital state at said external instruction mode terminal means for loading said first instruction register with the instruction read out from said second instruction store in response to the address from said external instruction counter.

6. The apparatus of claim 5, further comprising means for generating a second signal on said single chip microprocessor responsive to execution of a branch instruction on said single chip microprocessor with branch conditions met, and means for coupling said second signal to said external instruction counter for altering said external instruction counter.

7. The apparatus of claim 5 wherein the storage capacity of said second instruction store exceeds the storage capacity of said first instruction store.

8. The apparatus of claim 5 additionally comprising external mode terminal means on said single microprocessor chip, means for coupling said instruction read out of said second instruction store in response to the address generated in said external instruction counter to said external mode terminal means; and means for coupling said instruction read out of said second instruction store from said external mode terminal means to said first instruction register in response to said first signal having a digital state specifying external mode.

* * * * *